(12) United States Patent
Zhang et al.

(10) Patent No.: US 12,741,893 B2
(45) Date of Patent: Sep. 22, 2026

(54) CATALYTIC OXIDATION REACTOR AND COMPLETE SET OF EQUIPMENT

(71) Applicants: Shanghai Municipal Engineering Design Institute (Group) Co., Ltd., Shanghai (CN); Tongji University, Shanghai (CN)

(72) Inventors: Xin Zhang, Shanghai (CN); Lei Dong, Shanghai (CN); He Cui, Shanghai (CN); Yinguang Chen, Shanghai (CN); Zheyu Gu, Shanghai (CN); Keyang Wang, Changzhou (CN); Yuwei She, Shanghai (CN)

(73) Assignees: Shanghai Municipal Engineering Design Institute (Group) Co., Ltd., Shanghai (CN); Tongji University, Shanghai (CN)

( * ) Notice: Subject to any disclaimer, the term of this patent is extended or adjusted under 35 U.S.C. 154(b) by 21 days.

(21) Appl. No.: 19/010,365

(22) Filed: Jan. 6, 2025

(65) Prior Publication Data

US 2025/0230078 A1 Jul. 17, 2025

(30) Foreign Application Priority Data

Jan. 16, 2024 (CN) ........................ 202410061139.0

(51) Int. Cl.
*C02F 1/72* (2023.01)
*C02F 1/00* (2023.01)
*C02F 1/32* (2023.01)

(52) U.S. Cl.
CPC ............. *C02F 1/725* (2013.01); *C02F 1/008* (2013.01); *C02F 1/325* (2013.01);
(Continued)

(58) Field of Classification Search
CPC .......... C02F 1/725; C02F 1/008; C02F 1/325; C02F 2201/3223; C02F 2201/326;
(Continued)

(56) References Cited

FOREIGN PATENT DOCUMENTS

| | | |
|---|---|---|
| CN | 211800043 U | 10/2020 |
| CN | 115259277 A | 11/2022 |

OTHER PUBLICATIONS

Cnipa, Notification of First Office Action for CN202410061139.0, Aug. 22, 2025.

(Continued)

*Primary Examiner* — Brendan A Hensel
(74) *Attorney, Agent, or Firm* — Hemisphere Law, PLLC

(57) ABSTRACT

A catalytic oxidation reactor and a complete set of equipment are provided for water purification, the catalytic oxidation reactor includes a container, a reagent storage and delivery assembly and an ultraviolet lamp tube, the ultraviolet lamp tube is disposed in the container, and an annular gap cavity is defined between an inner wall of the container and an outer wall of the ultraviolet lamp tube; an outlet of the reagent storage and delivery assembly is disposed in the annular gap cavity, and the reagent storage and delivery assembly is configured to deliver the at least one oxidant to the annular gap cavity. Under the influence of ultraviolet photocatalysis, active free radicals are generated. Both the oxidant and these active free radicals flow out through multiple micro-holes situated on the sidewall of the container into a water body, serving to purify and disinfect it effectively.

7 Claims, 9 Drawing Sheets

(52) U.S. Cl.
CPC ................. *C02F 2201/3223* (2013.01); *C02F 2201/326* (2013.01); *C02F 2209/003* (2013.01); *C02F 2209/40* (2013.01); *C02F 2301/066* (2013.01); *C02F 2303/04* (2013.01); *C02F 2305/10* (2013.01)

(58) Field of Classification Search
CPC ............ C02F 2209/003; C02F 2209/40; C02F 2301/066; C02F 2303/04; C02F 2305/10; C02F 1/722; C02F 1/76; C02F 1/78; C02F 2209/006; C02F 1/50; C02F 2201/324
See application file for complete search history.

(56) References Cited

OTHER PUBLICATIONS

Shanghai Municipal Engineering Design and Research Institute (Group) Co., Ltd (Applicant), Replacement claims (allowed) of CN202410061139.0, Oct. 23, 2025.
CNIPA, Notification to grant patent right for invention in CN202410061139.0, Oct. 28, 2025.

```
In [ ]: # Define constants
        mu = 1
        L_1 = 0.4
        L_2 = 0.4
        L = L_1 + L_2

        # Calculation E_0
        def f_0(l):
            return (np.exp(-np.sqrt(0.1**2+(0.1+l)**2))/(4*np.pi*(0.1**2+(0.1+l)**2)))
        E_0, err_1 = integrate.quad(f_0, 0, L_1)
        E_0 = 150*0.8/ (2*E_0)
        E_0, err_1

Out[ ]: (162.8663400728986?, 1.0982098094803648e-10)

In [ ]: # Define function
        def cal_I_x_r(r):
            def f_1(l):
                return E_0 * np.exp( -mu * np.sqrt( r ** 2 + (r+l) ** 2 ) ) / ( L * 4* np.pi * ( r ** 2 + (r+l) ** 2 ) )
            v_1, err_1 = integrate.quad(f_1, 0, L_1)
            v_2, err_2 = integrate.quad(f_1, 0, L_2)

            return v_1 + v_2

In [ ]: # Calculation result
        x = [i/1000 for i in range(1,101)]
        y = [cal_I_x_r(i) for i in x]

In [ ]: # Drawing
        plt.title("2.1")
        plt.ylabel("I'x",loc = "center", rotation=0)
        plt.xlabel("r",loc = "center", rotation=0)
        sns.lineplot(x,y)
        plt.savefig("./2.1.png")
```

FIG. 11

CATALYTIC OXIDATION REACTOR AND COMPLETE SET OF EQUIPMENT

CROSS-REFERENCE TO RELATED APPLICATION

This application claims priority to Chinese Patent Application No. 202410061139.0, filed on Jan. 16, 2024, which is herein incorporated by reference in its entirety.

TECHNICAL FIELD

The disclosure relates to the field of environmental engineering water treatment technologies, and more particularly to a catalytic oxidation reactor and a complete set of equipment.

BACKGROUND

The ultraviolet lamp serves as an environmentally friendly, non-polluting, and highly efficient device for water purification and disinfection. Among the various forms and categories, the most common one is an ultraviolet lamp tube, which is widely used in water purification and disinfection devices. Given its ease of installation, simple operation, and notable effectiveness, the ultraviolet lamp has a very broad range of applications.

The aforementioned ultraviolet lamp is capable of emitting ultraviolet rays with a shorter wavelength ($\lambda<400$ nanometers abbreviated as nm). The ultraviolet rays can not only quickly denature proteins, thereby effectively killing almost all bacteria and pathogens in the water body, but also induce direct photolysis (reaction equations (1)-(4)) of organic matter in the water when the wavelength is shorter and the dosage is larger. The reaction equations (1)-(4) are as follows:

$$R + h\nu(\lambda < 185\ \text{nm}) \rightarrow R^*; \tag{1}$$

$$R^* \rightarrow \cdot R_1 + \cdot CH_2CH_3; \tag{2}$$

$$\cdot R_1 + h\nu(\lambda < 185\ \text{nm}) \rightarrow \cdot I_i(i = 1, 2, \ldots, n); \tag{3}$$

$$\cdot I_i + \cdot I_i \rightarrow P; \tag{4}$$

where $\cdot R_1$ represents an organic free radical, $\cdot I_i$ represents a free radical generated after a dehydrogenation reaction of the organic free radical, and P represents an electronic transfer reaction product between free radicals.

Based on conventional ultraviolet (UV) lamp disinfection and water purification technology, an advanced water purification method has been developed by integrating photocatalytic oxidation. This efficient water purification technology utilizes ultraviolet light in conjunction with semiconductor photocatalytic materials to enhance the purification process. This technology can effectively stimulate the generation of active free radicals such as hydroxyl radicals ($\cdot OH$) in water, through mechanisms including addition, substitution, electron transfer, and bond breaking, these active free radicals interact with organic compounds. As a result, macromolecular organic matter is degraded into smaller molecular substances. In many cases, this process continues until the organic matter is completely mineralized into carbon dioxide ($CO_2$) and water ($H_2O$), thereby achieving efficient water purification. The aforementioned active free radicals further include excited oxygen atoms ($O^1D$), superoxide free radicals $$(HO_2^- / O_2^-),$$

and singlet oxygen ($^1O_2$). These species also possess strong oxidizing properties and can undergo a similar mineralization reaction with $\cdot OH$ to achieve water purification (reaction equations (5)-(8)). The reaction equations (5)-(8) are as follows:

$$H_2O + h\nu \rightarrow \cdot OH + \cdot H; \tag{5}$$

$$R + \cdot OH \rightarrow ROH; \tag{6}$$

$$R + \cdot OH \rightarrow \cdot R + H_2O; \tag{7}$$

$$R^n + \cdot OH \rightarrow R^{n-1} + OH^-. \tag{8}$$

Related studies have shown that the combination of multiple oxidants and ultraviolet photocatalytic technology can further improve disinfection and purification efficiency of the water bodies, and achieve significant improvement in comparison to the use of a single oxidant or a single ultraviolet photocatalytic technology. For example, ozone alone reacts selectively with organic matter and cannot completely decompose it into carbon dioxide ($CO_2$) and water ($H_2O$). However, when ozone is combined with ultraviolet photocatalytic technology, the efficiency of water purification and disinfection can be significantly improved. The working principle of the combination of ozone and ultraviolet photocatalytic technology for water purification and deodorization is shown in the following reaction equations (9)-(11). Specifically, $O_3$ represents ozone, UV represents ultraviolet irradiation, hν represents photolysis, $O^1D$ represents excited oxygen atoms, $\cdot OH$ represents hydroxyl radicals, and $H_2O_2$ represents hydrogen peroxide:

$$O_3 + UV(\text{or } h\nu, \lambda < 310\ \text{nm}) \rightarrow O_2 + O(^1D); \tag{9}$$

$$O(^1D) + H_2O \rightarrow \cdot OH + \cdot OH \rightarrow H_2O_2\ (\text{in water}); \tag{10}$$

$$O(^1D) + H_2O \rightarrow \cdot OH + \cdot OH\ (\text{moist air}). \tag{11}$$

For example, the combination of ozone and hydrogen peroxide can also produce a synergistic enhancement effect, and its reaction principle is illustrated by the following reaction equation (12):

$$2O_3 + H_2O_2 \rightarrow \cdot OH + \cdot OH + 3O_2. \tag{12}$$

The reaction of chlorine dioxide ($ClO_2$) and hydrogen peroxide can generate hypochlorous acid ($HClO_2$) with a strong oxidizing property, and the following reaction equation (13) illustrates its reaction principle:

$$2ClO_2 + H_2O_2 \rightarrow 2HClO_2 + O_2. \tag{13}$$

The integration of hydrogen peroxide with ultraviolet (UV) photocatalytic technology also results in a significant synergistic effect. This enhanced interaction is demonstrated by the following reaction equation (14):

$$H_2O_2 + UV(\text{or } hv, \lambda \approx 200-280\text{ nm}) \rightarrow \cdot OH + \cdot OH. \quad (14)$$

Another example is the combination of chlorine dioxide solution and ultraviolet light (R represents an organic reactant, and R* represents an organic reaction product), and the mechanism behind this improved efficiency is detailed in the following reaction equation (15)-(16):

$$R + ClO_2 \rightarrow R^* + ClO_2^-; \quad (15)$$

$$ClO_2^- + hv(\lambda < 300\text{ nm}) \rightarrow 2O(^1D) + Cl^-. \quad (16)$$

However, there are two main limitations with the current use of ultraviolet (UV) lamps in water purification facilities. On one hand, the ultraviolet lamps in the water purification facilities only serve for ultraviolet disinfection, they are incapable of fully utilizing their inherent energy to achieve the water purification effect of ultraviolet photocatalysis. On the other hand, the ultraviolet lamps used for disinfection typically come encased in a protective quartz tube. Due to direct contact between the water and the outer wall of the quartz tube, prolonged operation of the Ultraviolet lamp can generate significant heat. This leads to scaling on the outer wall of the quartz tube at high temperatures, making it extremely difficult to clean.

SUMMARY

The disclosure has two main objectives. One is to address the following deficiencies of conventional ultraviolet (UV) lamps in the art, such as difficulty in effectively stimulating generation of active free radicals, poor water purification effect, easy scaling and difficulty in cleaning of an outer tube sleeve. The other is to appropriately modify the ultraviolet lamp and provide a catalytic oxidation reactor as part of a comprehensive equipment set, thereby enhancing overall performance and efficiency.

The disclosure solves the above technical problems through the following technical solutions.

A catalytic oxidation reactor for water purification includes a container, a reagent storage and delivery assembly and an ultraviolet lamp tube. The ultraviolet lamp tube is disposed in the container, and an annular gap cavity is defined between an inner wall of the container and an outer wall of the ultraviolet lamp tube. A main body of the reagent storage and delivery assembly is stored with at least one oxidant. An outlet of the reagent storage and delivery assembly is disposed in the annular gap cavity, enabling it to deliver stored oxidant to the annular gap cavity. A sidewall of the container defines micro holes, and the micro holes are configured to allow unidirectional liquid flow from an inside of the annular gap cavity to an outside of the container. The ultraviolet lamp tube and the container are disposed coaxially.

In this solution, the combined action of the ultraviolet lamp tube and the oxidant effectively stimulates the generation of active free radicals, such as hydroxyl free radicals, in the water body. Through mechanisms like addition, substitution, electron transfer, and bond breaking, these active free radicals interact with organic compounds in the water, degrading large molecular organic matter into smaller molecules or even directly into carbon dioxide and water. This process achieves efficient water purification, particularly having a good effect on new pollutants such as persistent organic pollutants, antibiotics, and endocrine disruptors. The ultraviolet lamp tube is disposed in the container, creating an annular gap cavity between the ultraviolet lamp tube and the container. This design ensures the generated active free radicals are concentrated in the annular gap cavity, thereby increasing the likelihood of high-concentration active free radicals contacting pollutants in the water body. This arrangement prevents the rapid loss or dilution of active free radicals, thereby enhancing oxidation treatment efficiency and disinfection effectiveness. By injecting at least one oxidant into the annular gap cavity between the ultraviolet lamp tube and the container, the ultraviolet lamp tube is isolated from the water body. This isolation minimizes heat transfer to the outer wall of the container, fundamentally preventing high-temperature scaling caused by pollutants on the ultraviolet lamp tube. Additionally, the injected oxidant and the stimulated high-concentration active free radicals have a good cleaning effect on the ultraviolet lamp tube and the sidewall of the container.

In addition, the ultraviolet lamp tube and the container are disposed coaxially, ensuring the volume of the annular gap cavity between the ultraviolet lamp tube and the inner wall of the container remain consistent. This uniformity forms a narrow space that continuously stimulate the generation of the active free radicals, facilitating even distribution and output of the oxidant within the annular gap cavity. Consequently, this design ensures more concentrations of both the oxidant and the active free radicals throughout the water body.

In an embodiment, the reagent storage and delivery assembly includes multiple reagent dispensers. The reagent dispensers are disposed on the container at intervals along an axial direction, and an outlet of each of the multiple reagent dispensers is disposed in the annular gap cavity.

In this solution, the multiple reagent dispensers are disposed on the container at intervals along the axial direction. The oxidant is continuously output to the annular gap cavity, which improves output stability and dispensing uniformity of the oxidant. The arrangement ensures the active free radicals maintain a high concentration at various positions in a flow direction of the container, facilitating efficient and continuous generation of the active free radicals and enhancing the purification effect on the water body.

In an embodiment, each reagent dispenser includes an annular main body, the annular main body is disposed in the annular gap cavity. The annular main body is provided with multiple outlets, which are arranged at intervals along a circumferential direction of the annular main body.

In this solution, by setting the annular main body, the oxidant is evenly distributed in the annular gap cavity between the ultraviolet lamp tube and the container, facilitating a more uniform oxidant concentration in the annular gap cavity. The uniform distribution ensures continuous and efficient generation of the active free radicals in the annular gap cavity, thereby improving the purification effect on the water body.

In an embodiment, the container is a transparent tube, the sidewall of this tube is perforated with multiple micro-holes, and at least one of the inner wall surface and the outer wall surface of the transparent tube is coated with an ultraviolet photocatalyst.

In this solution, the container is designed as the transparent tube, allowing ultraviolet rays to be refracted to or transmitted outside the transparent tube. The sidewall of the transparent tube is perforated with multiple micro-holes, enabling high-concentration active free radicals generated in the annular gap cavity to flow into the water body outside the tube. This mechanism produces a purification effect on the external water body. By coating the ultraviolet photocatalyst on the inner wall surface and/or the outer wall surface of the transparent tube, an ultraviolet catalytic effect is produced under ultraviolet irradiation. This method enhances the efficiency of generating active free radicals, thereby improving the purification effect of the catalytic oxidation reactor on the water body.

In an embodiment, the ultraviolet lamp tube is configured to disinfect a water purification facility. The ultraviolet lamp tube is nested within a quartz outer tube sleeve.

In this solution, by modifying the ultraviolet lamp used for disinfection of the water purification facility and its quartz outer tube sleeve, continuous and large-scale generation, together with diffusion of active free radicals can be achieved. The enhancement significantly improves the water purification and disinfection performance and facilitates easier cleaning of the ultraviolet lamp tube.

In an embodiment, the reagent storage and delivery assembly further includes a pressure booster. The pressure booster is in communication with the reagent storage and delivery assembly, and is configured to pressurize and output the at least one oxidant. Additionally, the reagent storage and delivery assembly further includes a flow controller, which is configured to adjust an output flow rate of the at least one oxidant.

In this solution, the pressure booster and the flow controller are configured to adjust the output flow rate of the oxidant. This adjustment facilitates increased concentrations of the oxidant and active free radicals in the water body, thereby improving the purification effect of the catalytic oxidation reactor on the water body.

In an embodiment, the catalytic oxidation reactor further includes a monitoring probe. The monitoring probe is configured to detect the pollutant concentration in the water body and/or ultraviolet irradiation intensity, and to provide feedback on these parameters.

In this solution, by taking use of the monitoring probes, the pollutant concentration and ultraviolet irradiation intensity can be monitored in real-time. When the pollutant concentration in the water body is excessively high or the ultraviolet irradiation intensity is insufficient, the monitoring probe can timely provide feedback. This allows for timely adjustments to the output flow rate of the oxidant and the irradiation intensity of the ultraviolet lamp tube, which facilitates the optimal allocation of resources.

In an embodiment, the catalytic oxidation reactor further includes an electronic controller. The electronic controller is electrically connected to the ultraviolet lamp tube, and is configured to adjust irradiation intensity of the ultraviolet lamp tube based on the pollutant concentration in the water body and the ultraviolet irradiation intensity feedback provided by the monitoring probe.

In this solution, when the pollutant concentration in the water body is excessively high or the ultraviolet irradiation intensity is insufficient, the monitoring probe provides feedback to the electronic controller. The electronic controller promptly adjusts the output flow rate of the oxidant and the irradiation intensity of the ultraviolet lamp tube. This allows for more convenient and precise adjustments to the oxidant concentration and/or the ultraviolet irradiation intensity, which is beneficial to the purification effect of the catalytic oxidation reactor.

In an embodiment, the catalytic oxidation reactor includes multiple monitoring probes. These probes are strategically disposed on the inner wall of the container and in the water body outside the sidewall of the container.

In this solution, the aforementioned settings enable monitoring of pollutant concentrations and/or ultraviolet irradiation intensity at various positions within the catalytic oxidation reactor. When the monitoring probe is disposed on the inner wall of the container, it can monitor the ultraviolet irradiation intensity inside the container to determine the condition of the ultraviolet lamp tube, such as identifying any faults, and adjusting the irradiation intensity accordingly via the electronic controller. Therefore, positioning the monitoring probe in the water body outside the sidewall of the container allows for the surveillance of both ultraviolet irradiation intensity and pollutant concentration in the water, ensuring the effectiveness of the water purification process.

A complete set of equipment includes multiple catalytic oxidation reactors arranged in parallel and working in coordination with each other. The irradiation intensity at the middle point between any two adjacent catalytic oxidation reactors is configured to meet the disinfection requirements of the water body.

The positive and progressive effects of the disclosure are illustrated in the followings.

(1) High-efficiency continuous stimulation and diffusion of active free radicals are achieved, thereby maximizing their water purification effect. This optimizes the performance of the ultraviolet lamp device, significantly enhancing water purification efficiency. The system ensures that the potential of the ultraviolet lamp is fully utilized, leading to superior water treatment outcomes.

(2) By injecting the water and oxidants into the annular gap cavity between the ultraviolet lamp sleeve and the newly added container, the active free radicals are efficiently and continuously generated in the annular gap cavity. The high-concentration of active free radicals then flow out through the micro holes in the sidewall of the container, effectively purifying and intensively disinfecting the water outside the container. This process fully compensates for the minor losses that occur when ultraviolet light is transmitted or refracted out of the container (both active free radicals and various oxidants further eliminate microorganisms in the water), thereby significantly improving the overall water purification and disinfection efficiency.

(3) By injecting at least one oxidant into the annular gap cavity between the ultraviolet lamp tube and the container, the ultraviolet lamp tube is isolated from the water body, thereby avoiding direct contact between the ultraviolet lamp tube and the treated water. This design minimizes the heat transfer to the outer wall of the container, fundamentally avoiding high-temperature scaling of pollutants in the water body on the ultraviolet lamp tube. Moreover, the injected oxidant and stimulated high-concentration active free radicals have a good cleaning effect on both the ultraviolet lamp tube and the sidewall of the container.

BRIEF DESCRIPTION OF DRAWINGS

FIG. 11 illustrates a schematic diagram of simulated PHTHON® codes of a distribution law of the ultraviolet irradiation intensity at different intervals outside the ultraviolet lamp tube of the catalytic oxidation reactor under the condition that the irradiation intensity at the outer wall of the ultraviolet lamp tube is 25000 $W/m^2$ according to an embodiment of the disclosure.

DESCRIPTION OF REFERENCE SIGNS

1—catalytic oxidation reactor; 11—container; 101—connector; 102—transparent tube; 103—micro hole; 104—ultraviolet photocatalyst; 105—reagent connecting tube; 106—ultraviolet lamp tube; 107—annular main body; 108—outlet; 109—connecting rod; 110—fixed hoop; 111—positioning curved rod; 112—control point; 2—reagent storage and delivery assembly; 3—reagent pumping assembly; 4—control assembly; 41—monitoring probe; 42—electronic controller; 5—operating platform; 6—pressure booster; 7—flow controller.

DETAILED DESCRIPTION OF EMBODIMENTS

The disclosure will be further described through embodiments below, but the disclosure is not limited in the scope of the embodiments.

Figure 1:
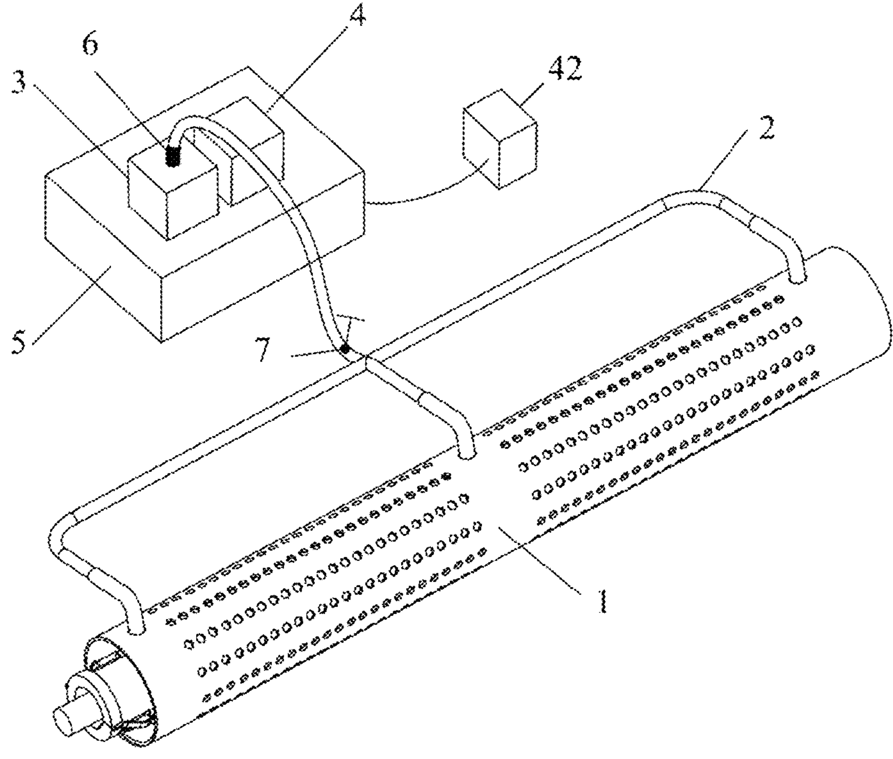
FIG. 1 illustrates a schematic three-dimensional structural diagram of a catalytic oxidation reactor according to an embodiment of the disclosure.
Figure 2:
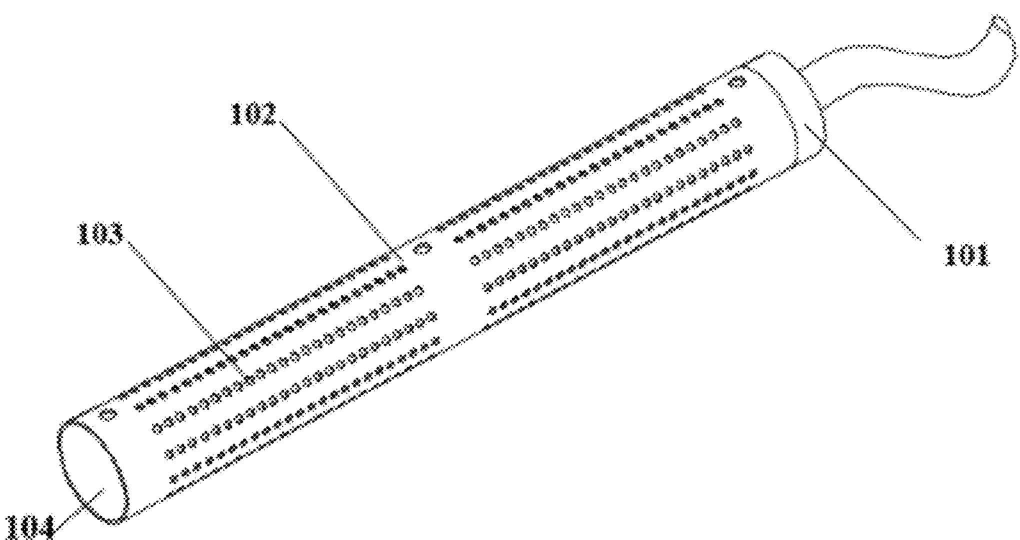
FIG. 2 illustrates a schematic structural diagram of an outer side of a container of the catalytic oxidation reactor according to an embodiment of the disclosure.
Figure 3:
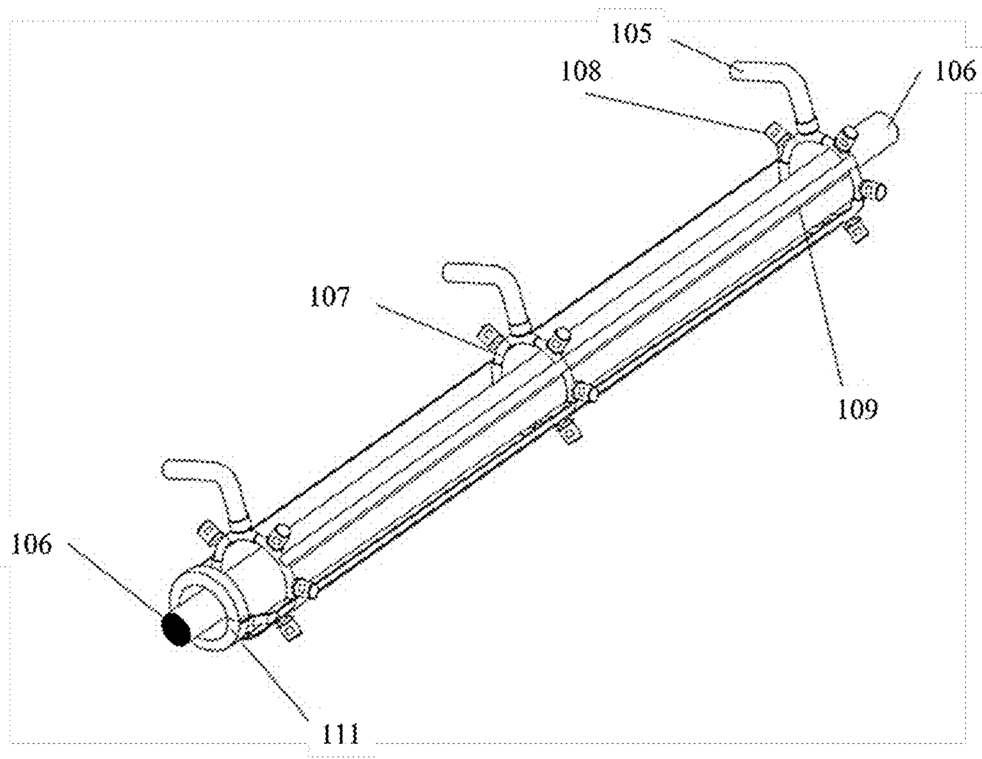
FIG. 3 illustrates a schematic structural diagram of an inside of the container of the catalytic oxidation reactor according to an embodiment of the disclosure.

The embodiment provides a catalytic oxidation reactor 1, which is externally mounted on an ultraviolet lamp tube 106, as shown in FIGS. 1-3, the catalytic oxidation reactor 1 is used for water purification. The catalytic oxidation reactor 1 includes a container 11, a reagent storage and delivery assembly 2 and the ultraviolet lamp tube 106. The ultraviolet lamp tube 106 is disposed in the container 11, and an annular gap cavity is defined between an inner wall of the container 11 and an outer wall of the ultraviolet lamp tube 106. An inlet of the container 11 is in communication with a water body of an outside. An outlet of the reagent storage and delivery assembly 2 is disposed in the annular gap cavity. A sidewall of the container 11 defines micro holes 103, and the micro holes 103 are configured to make liquid to flow unidirectionally from an inside of the annular gap cavity to an outside of the container 11. The reagent storage and delivery assembly 2 is configured to deliver stored oxidant to the annular gap cavity.

A combined action of the ultraviolet lamp tube 106 and the oxidant can effectively stimulate the generation of active free radicals, such as hydroxyl free radicals, in the water body. Through addition, substitution, electron transfer, bond breaking and other reactive mechanisms of the active free radicals and organic compounds in the water body, macromolecular organic matters are degraded into small molecule substances, or even directly mineralized into carbon dioxide and water. This process achieves effective water purification, particularly excelling in treating emerging contaminants such as persistent organic pollutants, antibiotics, and endocrine-disrupting chemicals. The ultraviolet lamp tube 106 is disposed in the container 11, the annular gap cavity is defined between the ultraviolet lamp tube 106 and the container 11, so that the generated active free radicals are concentrated in the annular gap cavity, the high-concentration active free radicals react with the water body outside the container 11, thereby preventing the rapid dilution or loss of active free radicals, achieving efficient removal of various pollutants, and improving an oxidation treatment efficiency and disinfection effectiveness.

In the embodiment, an irradiation wavelength of the ultraviolet lamp tube 106 is in a range of 100 nm to 400 nm, and a rated irradiation intensity at an outer wall of a quartz outer tube sleeve of the ultraviolet lamp tube 106 is in a range of 5000 $W/m^2$ to 50000 $W/m^2$. The oxidant is at least one selected from the group consisting of ozone, hydrogen peroxide and chlorine dioxide. When using multiple oxidants, the multiple oxidants can work in coordination to promote the catalytic oxidation reactor 1 to generate the active free radicals with a higher concentration. In other alternative embodiments, the ultraviolet lamp tube 106 can be other shaped ultraviolet lamps, such as an ultraviolet bulb according to requirements of purification effect or structure cooperation.

Figure 5:
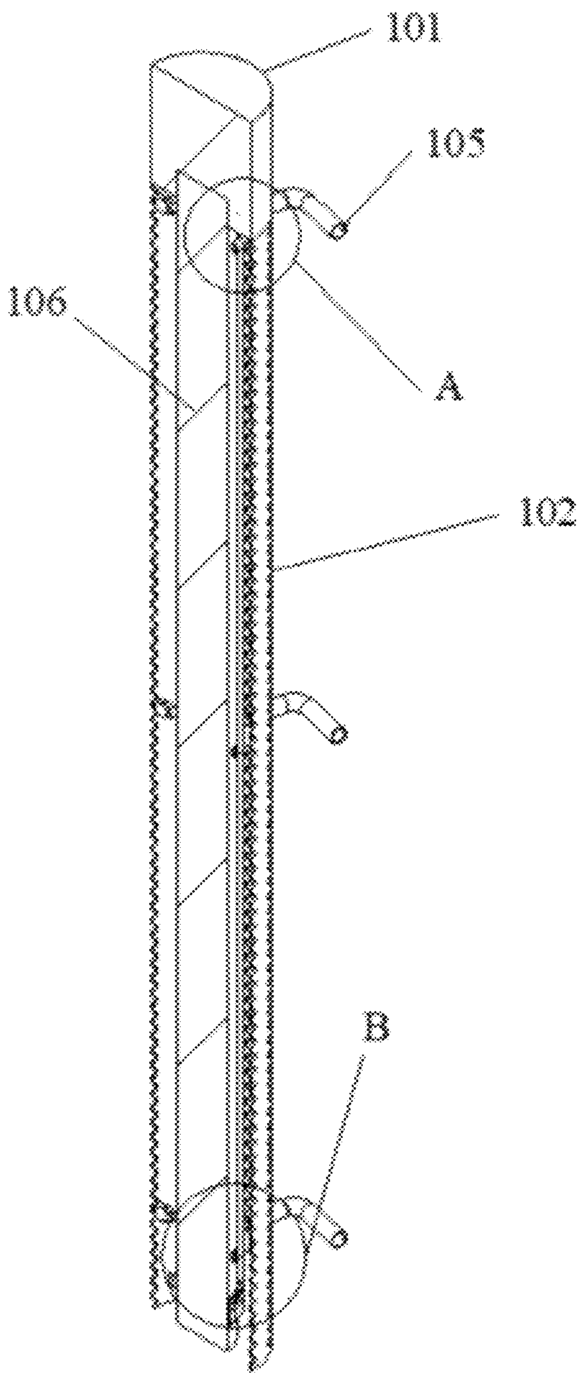
FIG. 5 illustrates an isometric sectional diagram of the catalytic oxidation reactor according to an embodiment of the disclosure.
Figure 6:
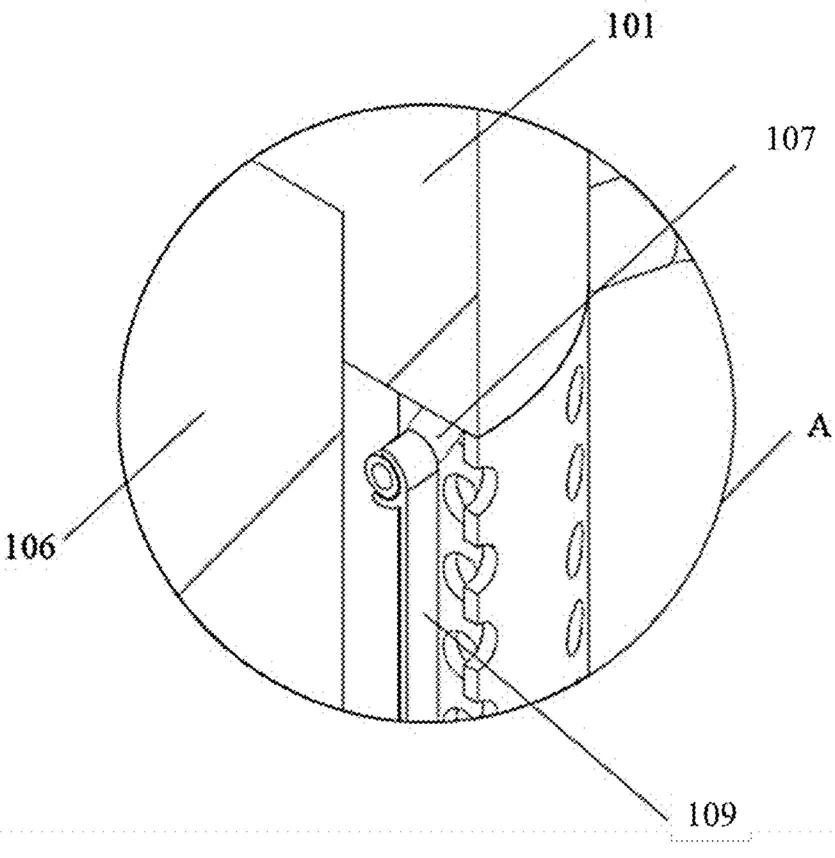
FIG. 6 illustrates an enlarged three-dimensional diagram of a part A in FIG. 5.
Figure 7:
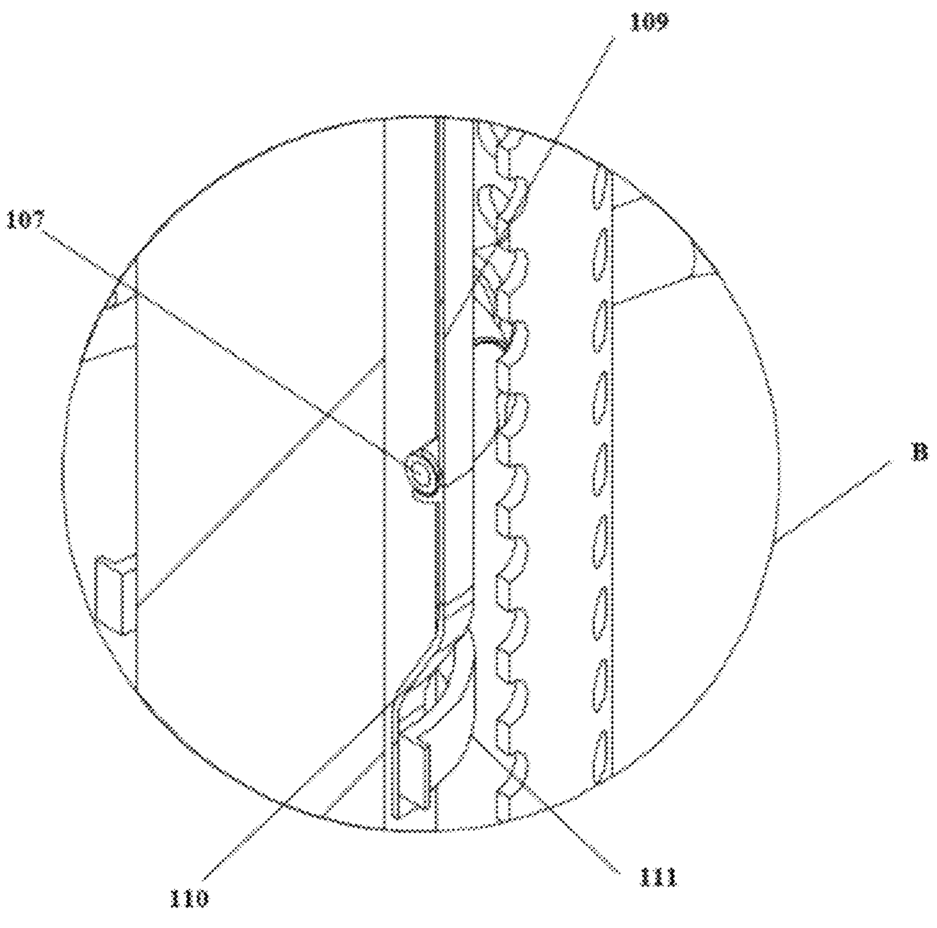
FIG. 7 illustrates an enlarged three-dimensional diagram of a part B in FIG. 5.

In an embodiment, as shown in FIG. 3 and FIG. 5, the reagent storage and delivery assembly 2 includes multiple reagent dispensers, the multiple reagent dispensers are disposed on the container 11 at intervals along an axial direction, and an outlet of each of the multiple reagent dispensers is disposed in the annular gap cavity.

The reagent storage and delivery assembly 2 continuously outputs the oxidant to the container 11. Multiple reagent dispensers are disposed on the container 11 at intervals along the axial direction, ensuring that the oxidant is continuously supplied to the annular gap cavity. This setup improves output stability and dispensing uniformity of the oxidant, maintaining a high concentration of active free radicals at various positions along the flow direction within the container 11, Consequently, this promotes efficient and continuous generation of active free radicals, thereby enhancing the purification effect on the water body.

Figure 4:
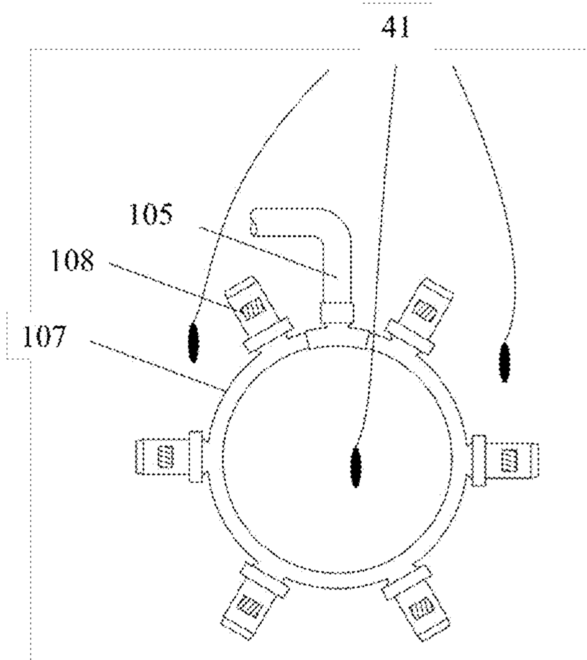
FIG. 4 illustrates a schematic structural diagram of a reagent dispenser of the catalytic oxidation reactor according to an embodiment of the disclosure.

In an embodiment, as shown in FIG. 4, each reagent dispenser includes an annular main body 107, the annular main body 107 is disposed positioned within the annular gap cavity and is equipped with outlets 108. Multiple outlets 108 are arranged at intervals along the circumferential direction of the annular main body 107.

By incorporating the annular main body 107, the oxidant is uniformly distributed within the annular gap cavity between the ultraviolet lamp sleeve 106 and the container 11. This ensures a more uniform concentration within the annular gap cavity, which facilitates the continuous and efficient generation of active free radicals, thereby enhancing the purification effect on the water body.

In the embodiment, the container 11 is a cylindrical transparent tube 102 with a length of the transparent tube 102 of 1 meter (m), and a thickness of the transparent tube 102 of 0.1 centimeter (cm), and a gap between an inner wall of the transparent tube 102 and an outer wall of the ultraviolet lamp tube 106 is 1.0 cm. An end of the transparent tube 102 is provided with a connector 101. In a flow direction of the water body, there are three reagent dispensers, each reagent dispenser is provided with the annular main body 107, and a reagent input assembly is connected to the annular main body 107 by a reagent connecting tube 105. The annular main body 107 contains an annular channel that connects to the outlets 108. Each annular main body 107 defines six outlets 108, which are evenly spaced along its circumferential direction. In other alternative embodiments, the transparent tube 102 can also be a variable column. The material used for the transparent tube 102 should have characteristics such as high temperature resistance, high light transmittance, and high strength. The number of the reagent dispensers and the outlets 108 are not specifically restricted.

In the specific implementation, as shown in FIGS. 3-7, an outer sidewall of the annular main body 107 is connected to the outlets 108 through a threaded manner. The top end of each outlet 108 tightly adheres to the inner wall of the transparent tube 102, serving to secure the annular main body 107. The connecting rod 109 links the outlets 108 that are aligned on the same axis. The most front and rear outlets 108 along the axial direction of the transparent tube 102 are fixedly connected to positioning curved rods 111. The inner wall of the positioning curved rods 111 closely adheres to the outer side wall near the front end of the ultraviolet lamp sleeve 106, while the outer side wall near the front end is equipped with a securing clamp 110. The materials used for the annular main body 107, outlets 108, connecting rods 109, positioning curved rods 111, and securing clamps 110 are all SS316L stainless steel (which is a stainless-steel material grade in China).

In an embodiment, as shown in FIG. 2, the container 11 is a transparent tube 102. The sidewall of the transparent tube 102 defines multiple micro-holes 103. The inner surface or outer surface of the transparent tube 102 is coated with an ultraviolet photocatalyst 104.

The container 11 is set as the transparent tube 102, so that ultraviolet rays can be refracted to or transmitted through the tube to purify the water outside the transparent tube 102. This setup creates an extended reaction zone around the transparent tube 102 for continuous oxidation treatment, thereby improving the overall purification and disinfection effect. The side walls of the transparent tube 102 defines multiple micro-holes 103, allowing the high-concentration active free radicals generated within the annular gap cavity to slowly diffuse out through these micro-holes 103, further purifying the water outside the transparent tube. Additionally, coating the ultraviolet photocatalyst 104 on the inner or outer surface of the transparent tube 102 enables the production of photocatalytic effects under ultraviolet irradiation. This increases the efficiency of generating active free radicals, which enhances the catalytic oxidation reactor's effectiveness in purifying the water.

In an embodiment, the transparent tube 102 is made from a material with characteristics of high temperature resistance, high light transmittance, and high strength. The micro-holes 103 form a uniform mesh distribution along the side walls extending axially on the transparent tube 102, with a pore diameter of 0.5 cm and a spacing of 2 cm between two adjacent micro holes 103. The ultraviolet photocatalyst 104 can be composed of one or more materials selected from the group consisting of black titanium, titanium dioxide ($TiO_2$), zinc oxide (ZnO), tin oxide ($SnO_2$), or zirconium dioxide ($ZrO_2$).

In an embodiment, as shown in FIG. 1 and FIG. 3, the ultraviolet lamp sleeve 106 is used in the disinfection stage of water purification facilities. It is externally fitted with a quartz outer tube sleeve.

By modifying the ultraviolet lamp and its quartz outer tube sleeve used for disinfection of the water purification facility, continuous and large-scale generation and diffusion of the active free radicals can be achieved. This significantly enhances the water purification and disinfection performance and facilitates easier cleaning of the Ultraviolet lamp sleeve 106.

In an embodiment, the reagent storage and delivery assembly 2 also includes a pressure booster. The pressure booster is connected to the reagent storage and delivery assembly 2 and is configured to pressurize the oxidant for output. The reagent storage and delivery assembly also includes a flow controller. The flow controller is configured to regulate the flow rate of the oxidant output.

In this solution, the pressure booster and the flow controller are set to adjust the output flow rate of the oxidant, which is conductive to increasing the concentrations of the oxidant and the active free radicals in the water body, and improving the purification effect of the catalytic oxidation reactor 1 on the water body.

In the embodiment, as shown in FIG. 1, the pressure booster is a pressurization pump. The reagent storage and delivery assembly 2 includes a reagent pumping assembly 3, which includes a pressurization pump and a reagent reservoir. The pressurization pump is located inside the reagent reservoir and is configured to pressurize and pump the oxidant from the reagent reservoir into the annular gap cavity of the catalytic oxidation reactor 1. The reagent pumping assembly 3 is placed on an operating platform 5 outside the water purification structure.

In an embodiment, the catalytic oxidation reactor 1 also includes a monitoring probe. The monitoring probe is configured to detect a pollutant concentration in the water body and/or ultraviolet irradiation intensity, and to provide feedback on these parameters.

By setting the monitoring probe, the pollutant concentration and the ultraviolet irradiation intensity at different positions of the catalytic oxidation reactor 1 can be monitored. When the monitoring probe is disposed on the inner wall of the container 11, it can measure the UV irradiation intensity inside the container 11 and help assess the condition of the ultraviolet lamp sleeve, such as detecting faults or adjusting the irradiation intensity based on inputs from the control components, such as detecting faults or adjusting the irradiation intensity based on inputs from the control components. When the monitoring probe is placed in the water body outside the sidewall of the container 11, it can monitor both the ultraviolet irradiation intensity and the pollutant concentration of the water body to ensure the water purification effect.

In an embodiment, the catalytic oxidation reactor 1 also includes the electronic controller. The electronic controller is electrically connected to the ultraviolet lamp tube 106, and is configured to adjust irradiation intensity of the ultraviolet lamp tube 106 according to the pollutant concentration and the ultraviolet irradiation intensity feedbacked by the monitoring probe.

When the pollutant concentration of the water body is excessively high or the ultraviolet irradiation intensity is insufficient, the monitoring probe provides feedback to the electronic control unit. The electronic controller adjusts the flow rate of the oxidant and the irradiation intensity of the ultraviolet lamp tube 106. This allows for more convenient and precise regulation of the oxidant concentration or the irradiation intensity of the ultraviolet lamp tube 106, thereby enhancing the purification efficiency of the catalytic oxidation reactor 1.

In an embodiment, the catalytic oxidation reactor 1 includes multiple monitoring probes. These probes are at least disposed on the inner wall and at the outlet of the container 11.

Through the above configuration, it is possible to monitor pollutant concentrations and/or UV irradiation intensity at different positions within the catalytic oxidation reactor 1. When the monitoring probes are installed on the inner wall of the container 11, they can monitor the ultraviolet irradiation intensity inside the container 11. This helps assess the condition of the ultraviolet lamp tube 106, such as detecting faults or adjusting the irradiation intensity based on feedback from the electronic control unit. When the monitoring probes are installed in the water body outside the sidewall of the container 11, they can monitor UV irradiation intensity and pollutant concentration of the water exiting the container. This ensures the effectiveness of the water purification process as the water flows out of container 11.

In the embodiment, as shown in FIG. 1, both the monitoring probes and the electronic controller belong to a control assembly 4. The control assembly 4 also includes a corrosion-resistant wires and an alarm. The ultraviolet lamp tube 106, the multiple monitoring probes and the alarm are electrically connected to the electronic controller by the corrosion-resistant wire. The monitoring probes are placed in the water body to be treated, with at least one monitoring probe set on the inner side of the inner wall of the porous transparent tube and the outer side of the transparent tube body 102. These probes can monitor the pollutant concentration of the water body and the ultraviolet irradiation intensity in real-time. When the pollutant concentration of the water body is excessively high or the ultraviolet irradiation intensity is insufficient, the monitoring probes provide feedback to the electronic controller, the electronic controller promptly sends an alarm signal to alert staff. This allows for timely adjustments to the irradiation intensity of the ultraviolet lamp tube 106 and the pressure applied by the pressurization pump for oxidant delivery, ensuring effective water purification. Specifically, the electrical controller of the control assembly 4 is located on the operating platform 5 outside the water purification structure. The reagent pumping assembly 3 and the control assembly 4 can connect to one or more ultraviolet lamp tubes 106 and reagent storage and delivery assemblies 2. The reagent pumping assembly 3 includes a pressurization pump and a reagent reservoir (not shown in the drawings).

Figure 9:
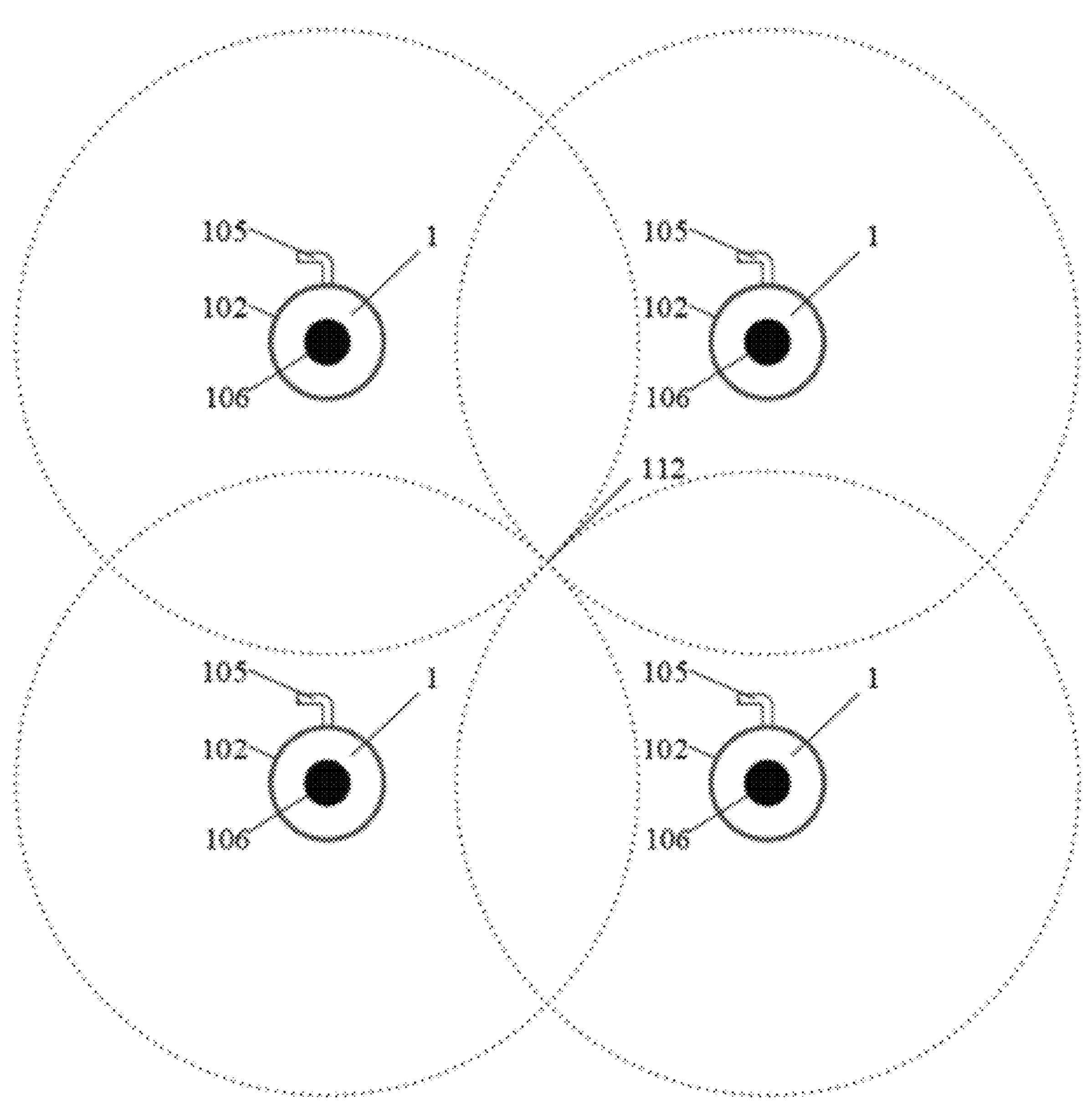
FIG. 9 illustrates a side diagram of a complete set of equipment which is cooperatively used by four groups of catalytic oxidation reactors according to an embodiment of the disclosure.
Figure 10:
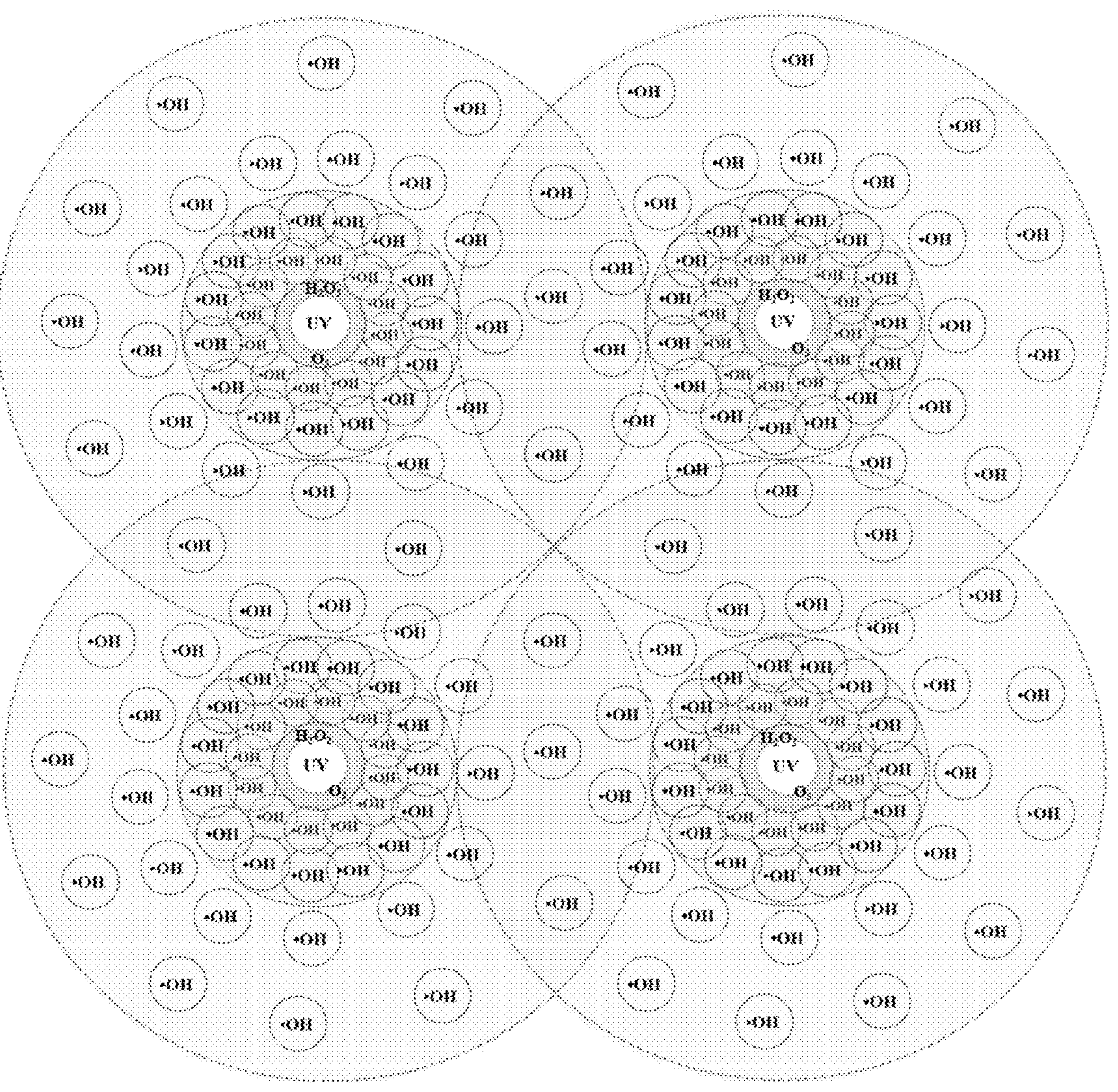
FIG. 10 illustrates a schematic diagram of a water purification principle of the complete set of equipment, which is cooperatively used by four groups of catalytic oxidation reactors according to an embodiment of the disclosure.

The embodiment also provides a complete set of equipment consisting of multiple catalytic oxidation reactors. As shown in FIG. 9 and FIG. 10, in the embodiment, the complete set of equipment includes four catalytic oxidation reactors 1 arranged in parallel. The irradiation intensity at the midpoint between two adjacent of the multiple catalytic oxidation reactors 1 meets the basic disinfection requirements of the water body.

The midpoint between diagonally adjacent catalytic oxidation reactors 1 in the integrated system is referred to as a control point 112. In this embodiment, the distance from control point 112 to the ultraviolet lamp tube 106 of the neighboring catalytic oxidation reactor 1 is 128 cm. By monitoring the UV irradiation intensity at the control point 112 and adjusting the power of the corresponding ultraviolet lamps, the system ensures that the UV radiation intensity at the control point 112 meets the water disinfection requirements.

By monitoring the ultraviolet irradiation intensity at the inner wall of the container 11 of the catalytic oxidation reactor 1, and adjusting the power of the corresponding ultraviolet lamp, it is ensured that the ultraviolet irradiation intensity at the inner wall of the container 11 can meet the conditions required for the extensive activation of reactive free radicals under UV photocatalytic action.

In the embodiment, the factory-rated irradiation intensity at the outer wall of the ultraviolet lamp tube 106 is 25000 $W/m^2$. The attenuation formula for the linear UV light source in water is as follows, with a linear attenuation coefficient of 1 $m^{-1}$ in water.

$$I' = \int_0^{L_1} \frac{E_0}{L} \frac{e^{-\mu\sqrt{r^2+(r+l)^2}}}{4\pi\left[r^2+(r+l)^2\right]} dl + \int_0^{L_2} \frac{E_0}{L} \frac{e^{-\mu\sqrt{r^2+(r+l)^2}}}{4\pi\left[r^2+(r+l)^2\right]} dl;$$

where I'represents illuminance at an observation point (lux abbreviated as 1×, or $W/m^2$); $E_0/L$ represents a luminous flux per unit length of the ultraviolet lamp tube 106 (lumen per meter abbreviated as 1 m/m, or watt per meter abbreviated as W/m); μ represents a linear attenuation coefficient of light in water, generally >1 ($m^{-1}$); r represents a distance between the outer wall of the ultraviolet lamp tube and the observation point (m); l represents a calculus variable, from 0 to L1, or from 0 to L2 (m); and L represents a total length of the ultraviolet lamp tube (m).

Figure 8:
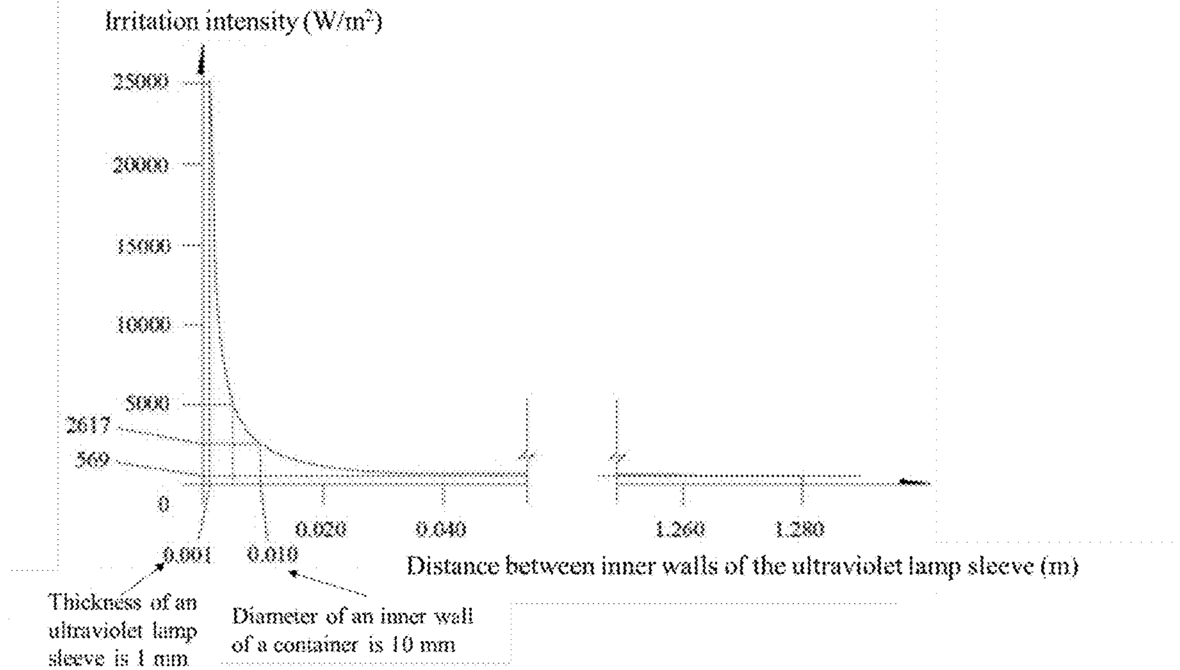
FIG. 8 illustrates a distribution diagram of ultraviolet irradiation intensity at different intervals outside an ultraviolet lamp tube of the catalytic oxidation reactor, under the condition that irradiation intensity at an outer wall of the ultraviolet lamp tube is 25000 watts per square meter ($W/m^2$) according to an embodiment of the disclosure.

According to the above formula, a relationship curve between the ultraviolet irradiation intensity monitored by the monitoring probe and the distance between the inner walls of the ultraviolet lamp tube is fitted by programming in PYTHON® language as shown in FIG. 8 (the PYTHON® code is shown in FIG. 11).

As shown in FIG. 8, at the outer wall of the ultraviolet lamp tube 106 (wall thickness 0.1 cm), the measured irradiation intensity is 25,000 $W/m^2$. This high irradiation intensity can directly photolyze the water, generating a significant amount of reactive free radicals. At the inner wall of container 11 (with a 0.9 cm gap between the inner wall of container 11 and the outer wall of the ultraviolet lamp tube 106), the measured irradiation intensity is 2617 $W/m^2$. This irradiation intensity ensures that the oxidant is activated under UV photocatalytic action, producing a substantial number of reactive free radicals. At the control point 112 outside container 11 (127.9 cm from the inner wall of the ultraviolet lamp tube 106), the measured irradiation intensity is 569 $W/m^2$. This irradiation intensity is sufficient to deactivate viruses, bacteria, and other microorganisms in the water through UV irradiation, ensuring effective disinfection.

Firstly, at the outer wall of the ultraviolet lamp tube 106 (wall thickness 0.1 cm), the monitored irradiation intensity has decreased to 20,300 $W/m^2$. Despite this reduction, the irradiation intensity remains high enough to directly photolyze the water, generating a significant amount of reactive free radicals. At the inner wall of container 11 (with a 0.9 cm gap between the inner wall of container 11 and the outer wall of the ultraviolet lamp tube 106), the monitored irradiation intensity is 1,917 $W/m^2$. This irradiation intensity is insufficient to activate the oxidant under UV photocatalytic action, resulting in inadequate production of reactive free radicals.

Secondly, the dosage of the oxidant was increased to clean the outer wall of the ultraviolet lamp tube 106 and the side wall of container 11. After cleaning, the monitored irradiation intensity at the inner wall of container 11 reached 2059 $W/m^2$. However, this irradiation intensity is still insufficient to activate the oxidant under UV photocatalytic action, resulting in inadequate production of reactive free radicals.

Next, the power of the ultraviolet lamps is increased to achieve an irradiation intensity of 2500 $W/m^2$ at the inner wall of container 11. This irradiation intensity is just sufficient to activate the oxidant under UV photocatalytic action, producing a large number of reactive free radicals. At the control point 112 outside container 11 (127.9 cm from the inner wall of the ultraviolet lamp tube 106), the monitored irradiation intensity is 406 $W/m^2$. This irradiation intensity is insufficient to deactivate viruses, bacteria, and other microorganisms in the water through UV irradiation.

Finally, the power of the ultraviolet lamps is further increased to achieve an irradiation intensity of 500 $W/m^2$ at the control point 112, which is located 127.9 cm from the inner wall of the ultraviolet lamp tube 106. This irradiation intensity is precisely sufficient to deactivate viruses, bacteria, and other microorganisms in the water through UV irradiation.

While the foregoing describes specific embodiments of the disclosure, it is understood by those skilled in the art that these descriptions are illustrative only. The scope of the disclosure is defined by the appended claims. Those skilled in the art may make various changes or modifications to these embodiments without departing from the principles and essence of the disclosure, and such changes and modifications are encompassed within the scope of protection of the disclosure.

What is claimed is:

1. A catalytic oxidation reactor for water purification, comprising: a container, a reagent storage and delivery assembly, and an ultraviolet lamp tube, wherein the ultraviolet lamp tube is disposed in the container, and an annular gap cavity is defined between an inner wall of the container and an outer wall of the ultraviolet lamp tube;

wherein a main body of the reagent storage and delivery assembly is stored with at least one oxidant, an outlet of the reagent storage and delivery assembly is disposed in the annular gap cavity, and the reagent storage and delivery assembly is configured to deliver the at least one oxidant to the annular gap cavity; and a sidewall of the container defines holes, and the holes are configured to make liquid to flow unidirectionally from an inside of the annular gap cavity to an outside of the container; and wherein the ultraviolet lamp tube and the container are disposed coaxially;

wherein the reagent storage and delivery assembly comprises multiple reagent dispensers, the multiple reagent dispensers are disposed on the container at intervals along an axial direction, and an outlet of each of the multiple reagent dispensers is disposed in the annular gap cavity;

wherein each of the multiple reagent dispensers comprises an annular main body, the annular main body is disposed in the annular gap cavity, the annular main body is provided with multiple outlets thereon, and the multiple outlets are arranged at intervals along a circumferential direction of the annular main body; and wherein an outer sidewall of the annular main body is connected to the multiple outlets through a threaded manner, and a top end of each of the multiple outlets is tightly adhered to the inner wall of the container.

2. The catalytic oxidation reactor as claimed in claim 1, wherein the container is a transparent tube, a sidewall of the transparent tube defines the multiple holes, and at least one of an inner wall surface and an outer wall surface of the transparent tube is coated with ultraviolet photocatalyst.

3. The catalytic oxidation reactor as claimed in claim 1, wherein the ultraviolet lamp tube is configured to disinfect a water purification facility, and an outside of the ultraviolet lamp tube is nested within a quartz outer tube sleeve.

4. The catalytic oxidation reactor as claimed in claim 1, wherein the reagent storage and delivery assembly further comprises a pressure booster, the pressure booster is in communication with the reagent storage and delivery assembly, and is configured to pressurize and output the at least one oxidant; and the reagent storage and delivery assembly further comprises a flow controller, and the flow controller is configured to adjust an output flow rate of the at least one oxidant.

5. The catalytic oxidation reactor as claimed in claim 1, further comprising a monitoring probe; wherein the monitoring probe is configured to detect at least one of a pollutant concentration of a water body and ultraviolet irradiation intensity, and feedback the at least one of the pollutant concentration of the water body and the ultraviolet irradiation intensity.

6. The catalytic oxidation reactor as claimed in claim 5, further comprising an electronic controller; wherein the electronic controller is electrically connected to the ultraviolet lamp tube, and is configured to adjust irradiation intensity of the ultraviolet lamp tube according to the pollutant concentration of the water body and the ultraviolet irradiation intensity feedbacked by the monitoring probe.

7. The catalytic oxidation reactor as claimed in claim 5, wherein the monitoring probe is provided in multiple quantities; and the multiple monitoring probes are configured to monitor at least one of the pollutant concentration of the water body and the ultraviolet irradiation intensity; and the multiple monitoring probes are disposed on both the inner wall of the container and in proximity to the water body outside the sidewall of the container.

* * * * *